(12) United States Patent
Inomata et al.

(10) Patent No.: US 7,487,368 B2
(45) Date of Patent: Feb. 3, 2009

(54) ILLEGAL COMMUNICATION DETECTOR, ILLEGAL COMMUNICATION DETECTOR CONTROL METHOD, AND STORAGE MEDIUM STORING PROGRAM FOR ILLEGAL COMMUNICATION DETECTOR CONTROL

(75) Inventors: Kohshiro Inomata, Nakai-machi (JP); Katsuya Mitsutake, Nakai-machi (JP)

(73) Assignee: Fuji Xerox Co., Ltd., Toyko (JP)

( * ) Notice: Subject to any disclaimer, the term of this patent is extended or adjusted under 35 U.S.C. 154(b) by 984 days.

(21) Appl. No.: 10/819,233

(22) Filed: Apr. 7, 2004

(65) Prior Publication Data

US 2005/0022000 A1    Jan. 27, 2005

(30) Foreign Application Priority Data

Jul. 25, 2003    (JP) .............................. 2003-279958

(51) Int. Cl.
*G06F 1/20* (2006.01)
(52) U.S. Cl. ...................... 713/194; 713/189
(58) Field of Classification Search .............. 713/194, 713/189
See application file for complete search history.

(56) References Cited

FOREIGN PATENT DOCUMENTS

| CN | 1421771 A | 6/2003 |
|---|---|---|
| JP | A 2000-181867 | 6/2000 |
| KR | 1020000054538 A | 9/2000 |
| KR | 1020010085056 A | 9/2001 |
| KR | 1020030052512 A | 6/2003 |

*Primary Examiner*—Thomas R Peeso
(74) *Attorney, Agent, or Firm*—Oliff & Berridge, PLC

(57) ABSTRACT

An illegal communication detector that is mounted in a communication path between external devices and a protection-targeted device to monitor contents of communications delivered to the protection-targeted device, the illegal communication detector including: a recording unit that records at least part of information transmitted from the external devices to the protection-targeted device; a determination unit that regards one of the external devices as a device of interest; and a communication control unit that detects, if the determination means conclude that at least part of the recorded information complies with the predetermined illegal communication standard rule, that the contents of communication are derived from an illegal communication, and performing a predetermined process concerning the communication with the device of interest.

16 Claims, 3 Drawing Sheets

| CONTENTS OF COMMUNICATION | | | DATE AND TIME |
|---|---|---|---|
| HTTP REQUEST HEADER | REQUEST LINE | .... | yy.mm.dd hh.MM.ss |
| HTTP RESPONSE MESSAGE .... | | | yy.mm.dd hh.MM.ss |

FIG. 3B

USER AUTHENTICATION INFORMATION : aaaa

| CONTENTS OF COMMUNICATION | | | DATE AND TIME |
|---|---|---|---|
| HTTP REQUEST HEADER | REQUEST LINE | .... | yy.mm.dd hh.MM.ss |
| HTTP RESPONSE MESSAGE .... | | | yy.mm.dd hh.MM.ss |

ILLEGAL COMMUNICATION DETECTOR, ILLEGAL COMMUNICATION DETECTOR CONTROL METHOD, AND STORAGE MEDIUM STORING PROGRAM FOR ILLEGAL COMMUNICATION DETECTOR CONTROL

BACKGROUND OF THE INVENTION

1. Field of the Invention

The present invention relates to an illegal communication detector that monitors contents of communications delivered to a server connected to an intra-organizational network or other similar protection-targeted devices, and detects any illegal communication.

2. Description of the Related Art

In recent years, the style of connection to the Internet is diversified. For example, corporate employees can access an intra-corporate server from a personal computer and the like device at their home via a network and perform jobs without actually going to the office or can access the intra-corporate server from the outside to retrieve e-mail.

In such a situation, the intra-corporate server generally performs personal authentication with a user name, password and the like for the purpose of allowing an employee to access the information retained within the server only when the employee is authenticated.

However, if a user name, a password, or other items of information leak out, an illegal action called "spoofing" (pretending to be someone else) can be performed to read information from the intra-corporate server. To avoid such a problem, the degree of stringency of authentication can be increased by use of a technique which uses the information about the employed computer communication card for personal authentication in addition to personal identification information.

However, personal authentication is based on the information existing on the user side as described above. If a malicious user gathers the information about an authorized user, the malicious user can theoretically perform "spoofing".

Further, illegal communications based on "spoofing" differ from attacks such as DoS and port scan so that it is generally difficult to differentiate "spoofing" from an authorized use.

The present invention is therefore made to address the foregoing problems and provide an illegal communication detector that is capable of detecting and handling an illegal communication such as "spoofing".

SUMMARY OF THE INVENTION

To address the problems described above, the present invention provides an illegal communication detector that is mounted in a communication path between external devices and a protection-targeted device to monitor contents of communications delivered to the protection-targeted device. The illegal communication detector includes a recorder that records at least part of information transmitted from the external devices to the protection-targeted device; a detector that regards one of the specific devices as a device of interest and detects, when at least part of the recorded information transmitted from the device of interest complies with a predetermined illegal communication standard rule, that the contents of communication are derived from an illegal communication.

To address the problems described above, the present invention provides an illegal communication detector that is mounted in a communication path between external devices and a protection-targeted device to monitor contents of communications delivered to the protection-targeted device. The illegal communication detector includes a recording unit that records at least part of information transmitted from the external devices to the protection-targeted device; a memory that stores information about conditions for the communication from each of the specific devices; a detector that regards one of the specific devices as a device of interest and detects, when at least part of the recorded information transmitted from the device of interest complies with the information about the conditions for the communication, that the contents of communication are derived from an illegal communication.

To address the problems described above, the present invention provides an illegal communication detector that is mounted in a communication path between external devices and a protection-targeted device to monitor contents of communications delivered to the protection-targeted device. The illegal communication detector includes a recorder that records at least part of information transmitted from the external devices to the protection-targeted device; a detector that regards one of the specific devices as a device of interest and detects, when at least part of the recorded information transmitted from the device of interest complies with a predetermined illegal communication standard rule, that the contents of communication are derived from an illegal communication a communication controller that performs a predetermined process concerning the communication with the device of interest.

To address the problems described above, the present invention also provides an illegal communication detector that is included in a system providing communication between a first network and a second network to monitor contents of communications delivered from a device in the first network to a protection-targeted device that is in the second network. The illegal communication detector includes a recorder that records at least part of information transmitted from the specific devices to the protection-targeted device; a detector that regards one of the specific devices as a device of interest and detects, when at least part of the recorded information transmitted from the device of interest complies with a predetermined illegal communication standard rule, that the contents of communication are derived from an illegal communication.

To address the problems described above, the present invention also provides a method for controlling an illegal communication detector that is mounted in a communication path between external devices and a protection-targeted device to monitor contents of communications delivered to the protection-targeted device. The method records at least part of information transmitted from the external devices to the protection-targeted device; regards one of the specific devices as a device of interest; detects, when at least part of the recorded information transmitted from the device of interest complies with a predetermined illegal communication standard rule, that the contents of communication are derived from an illegal communication.

To address the problems described above, the present invention also provides a method for controlling an illegal communication detector that is mounted in a communication path between external devices and a protection-targeted device to monitor contents of communications delivered to the protection-targeted device. The method records at least part of information transmitted from the specific devices to the protection-targeted device; regards one of the specific devices as a device of interest; detects, when at least part of the recorded information transmitted from the device of interest complies with the information about the conditions for the communication from each of the specific devices, that the contents of communication are derived from an illegal communication.

To address the problems described above, the present invention also provides a method for controlling an illegal communication detector that is mounted in a communication path between external devices and a protection-targeted device to monitor contents of communications delivered to the protection-targeted device. The method records at least part of information transmitted from the specific devices to the protection-targeted device; regards one of the specific devices as a device of interest; detects, when at least part of the recorded information transmitted from the device of interest complies with a predetermined illegal communication standard rule, that the contents of communication are derived from an illegal communication performing a predetermined process concerning the communication with the device of interest.

To address the conventional problems described above, the present invention also provides a storage medium readable by a computer. The storage medium stores a program of instructions executable by the computer. The program causes an illegal communication detector, which is mounted in a communication path between external devices and a protection-targeted device to monitor contents of communications delivered to the protection-targeted device, to perform a function, which includes recording at least part of information transmitted from the external devices to the protection-targeted device; regarding one of the specific devices as a device of interest; detecting, when at least part of the recorded information transmitted from the device of interest complies with a predetermined illegal communication standard rule, that the contents of communication are derived from an illegal communication.

BRIEF DESCRIPTION OF THE DRAWINGS

Preferred embodiments of the present invention will be described in detail based on the following figures, wherein.

DETAILED DESCRIPTION OF PREFERRED EMBODIMENTS

Figure 1:
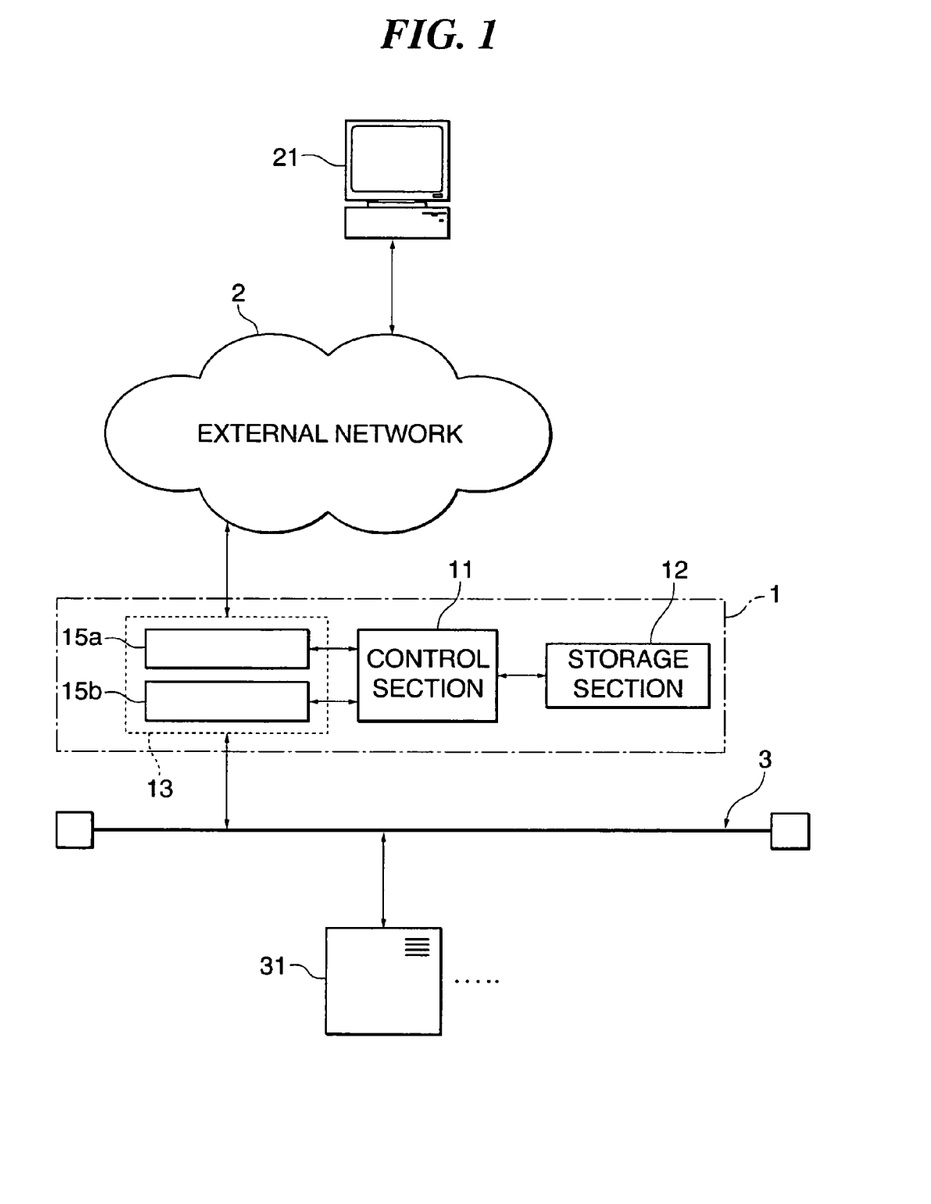
FIG. 1 is a configuration block diagram illustrating an illegal communication detector according to one embodiment of the present invention and its connection.

Preferred embodiments of the present invention will now be described with reference to the accompanying drawings. As shown in FIG. 1, an illegal communication detector 1 according to the present invention is connected between an external network (e.g., the Internet) 2 and an internal network 3. The illegal communication detector 1 is mounted in a communication path that allows a terminal in the external network 2 to access a computer or other devices connected to the internal network 3. Further, the external network 2 is connected to multiple information processing devices including an external user terminal 21, whereas the internal network 3 is connected to multiple information processing devices including a server 31.

The illegal communication detector 1 includes a control section 11, a storage section 12, and a communication section 13. The control section 11 operates in accordance with a program stored in the storage section 12 to perform a process (intermediary process) for receiving the information addressed to an information processing device in the internal network 3 from the external network 2 and transmitting the received information to the internal network 3 and for receiving the information addressed to an information processing device in the external network 2 from an information processing device in the internal network 3 and transmitting the received information to the external network 2.

The control section 11 also performs an illegal communication detection process for recording in the storage section 12 the communications addressed to at least a specified destination and detecting an illegal communication on the basis of the recorded communications. Further, the control section 11 performs a responsive process upon detection of an illegal communication. These processes will be described later in detail.

The storage section 12 includes a computer-readable recording medium that stores mainly the program to be executed by the control section 11, and a drive that reads the program and other data from the recording medium. Further, the storage section 12 stores, for instance, the information entered from the control section 11 as the data in a specified format in compliance with instructions issued by the control section 11.

The communication section 13 may be, for example, a network interface. In compliance with instructions issued by the control section 11, the communication section 13 transmits information to a specified destination and outputs the information received from the outside to the control section 11. As shown in FIG. 1, the communication section 13 may include a first network card 15a, which is connected to the external network 2, and a second network card 15b, which is connected to the internal network 3. In this instance, the control section 11 may additionally perform a process as a router.

An ordinary personal computer may be used as the external user terminal 21. The server 31 may be, for example, a Web server. Upon receipt of request information conforming to the HTTP (Hyper Text Transfer Protocol), the server 31 supplies a file and the like to a requesting source in compliance with a request indicated by the received request information. The server 31 may also operate an application that coordinates with a Web server, cause the application to operate in compliance with the request information received by the Web server, and supply the result of operation. It is assumed that the server 31 uses HTTP basic authentication for user authentication purposes.

When the server 31 operates as a Web server, the external user terminal 21 operates the Web server to transmit HTTP request information (HTTP request) to the server 31, and receives, for instance, the result of a process performed in compliance with the request. As the information concerning basic authentication, the HTTP request includes user-identification information (information concerning user authentication). The authorization field of a header for the request includes the user-identification information.

Figure 2:
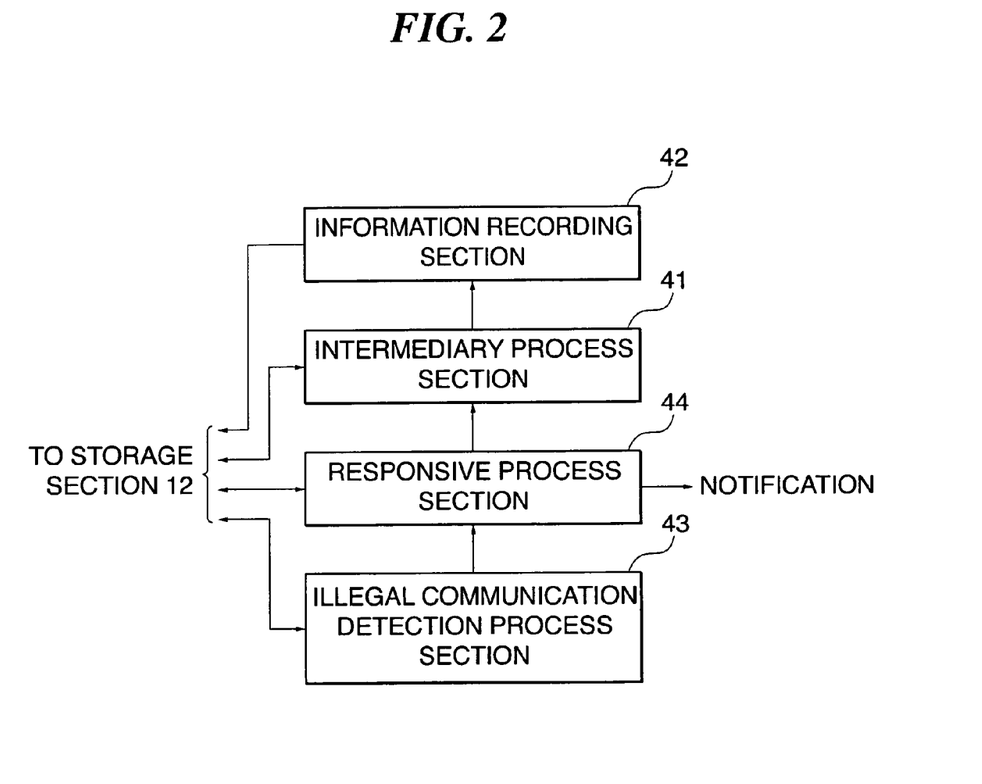
FIG. 2 is a functional block diagram illustrating a typical program executed by a control section.

The process performed by the control section 11 will now be described in detail. As shown in FIG. 2, a typical program executed by the control section 11 functionally includes an intermediary process section 41, an information recording section 42, an illegal communication detection process section 43, and a responsive process section 44. The intermediary process section 41 causes the control section 11 to perform an intermediary process for receiving the information addressed to the server 31 in the internal network 3 from the external network 2 and transmitting the received information to the internal network 3 and for receiving the information addressed to an information processing device in the external network 2 (e.g., the information addressed to the external user terminal 21) from the server 31 in the internal network 3 and transmitting the received information to the external network 2.

In response to a setting for protecting, for instance, the server 31, which is one of the devices in the internal network 3, the information recording section 42 causes the control section 11 to perform a subsequent illegal communication detection process. The control section 11 performs a process of the information recording section 42 by checking the information that is received by the first network card 15a connected to the external network 2 and output by the communication section 13, and causing the storage section 12 to record the information for a device that is targeted for protection (i.e., the information to be transmitted from an external device to a protection-targeted device).

A example of a process performed for request information transmission from the external user terminal 21 to the server 31 will now be described. Although the subsequent description assumes that the relevant information is to be entirely recorded, an alternative is to record only the information that is relevant or irrelevant to a specified protocol. For example, the process may be performed to record HTTP information but not Ping information. The process may alternatively be performed to record the information about a service related to a port number for an open port of the server 31 while ignoring a service related to a port number for a closed port. Further, it is also possible to record only the information prevailing after a user at the external user terminal 21 is authenticated by the control section 11 or determine according to conditions stipulated by the relationship to a process of the control section 11 whether or not to record information.

Figure 3A:
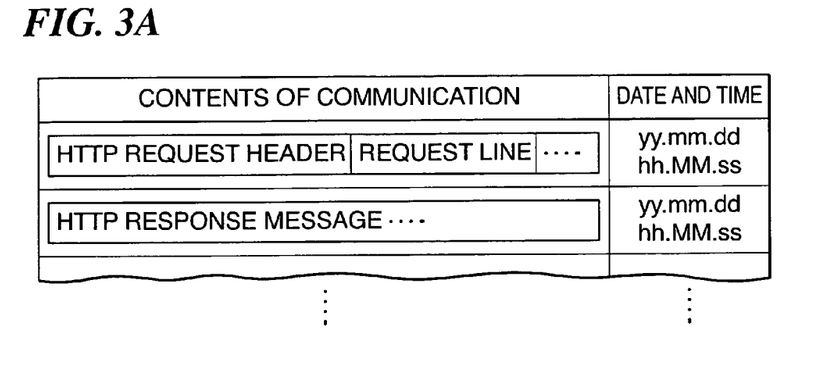
FIGS. 3A and 3B illustrate typical items of information to be recorded in a storage section.

For example, as shown in FIG. 3A, the control section 11 records in the storage section 12 a series of sets of HTTP request information (request messages) received from the external network 2 and the information about the date and time of reception of such information (the control section 11 acquires this date/time information from a calendar clock section, which is not shown). The HTTP request includes a request line and a request header. As described earlier, the request header includes an Authorization field, which is used to record user identification information. The HTTP specifications are detailed, for instance, in RFC 2616 (Request for Comments 2616) "Hypertext Transfer Protocol—HTTP/1.1".

The control section 11 also records in the storage section 12 the relationship between the information about a response from the server 31 (i.e., the information to be transmitted from the server 31, which is targeted for monitoring, to the external user terminal 21, which is an external device) and the information about the date and of the response. The information about the response includes an HTTP response message. The HTTP response message includes an entity header field that contains a Content-Length field, which indicates the size of data.

Figure 3B:
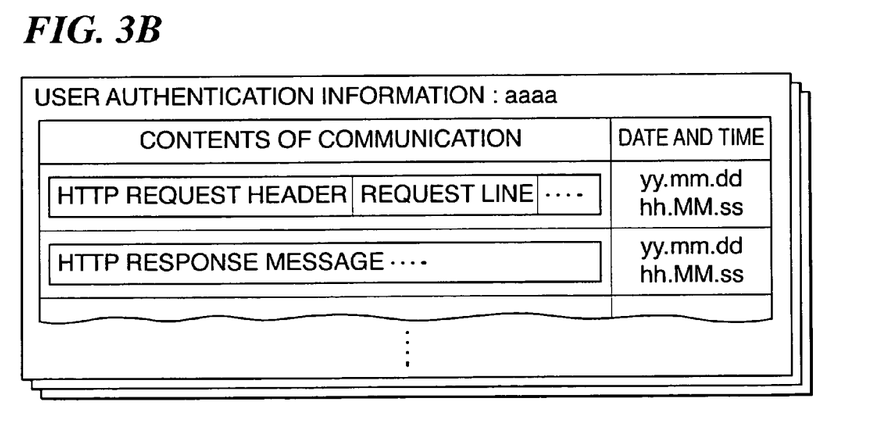

As shown in FIG. 3B, the control section 11 may record the request information related to each HTTP and the information about a response from the server 31 while sorting them by user using the user identification information contained in the above-mentioned Authorization field as a key.

The illegal communication detection process section 43 of the program executed by the control section 11 checks whether the information recorded in the storage section 12 by the information recording section 42 complies with a predetermined illegal communication standard rule. If the recorded information is found to in compliance with the illegal communication standard rule, the responsive process section 44 starts running. For example, the recorded information may alternatively be checked to determine whether individual users' requests issued during a specified period (the individual user records correspond to the information derived from individual devices of interest) comply with the predetermined illegal communication standard rule.

The illegal communication standard rule can be formulated in various manners. For example, the illegal communication standard rule can be defined as the number of requests. Each HTTP request contains some items of method information, which relate to the types of information to be obtained as a response and the types of operations (file deletion, etc.) of the server side (server 31 in the present example). A threshold value can be set for each item of method information so as to use the resulting threshold values as the illegal communication standard rule.

In the instance described above, the control section 11 calculates the total number of request methods used during the last 10 minutes in accordance, for instance, with the recorded information. Request methods for HTTP include a HEAD method, GET method, and POST method. The control section 11 counts the number of various methods. The control section 11 then compares the number of various methods against the associated threshold value settings. If the number of any methods exceeds the associated threshold value setting, the control section 11 concludes that an illegal communication is encountered, and then performs a responsive process as described later. In the present example, a predetermined process of the responsive process section 44 is performed when, for instance, it is found that "a certain threshold value is exceeded by the number of folders accessed during a predetermined period of time" or that "a certain threshold value is exceeded by the number of deleted files".

Although the example described above uses a predetermined threshold value for each method, an illegal communication may alternatively be checked for by determining whether a predetermined threshold value is exceeded by the total number of methods.

Instead of using the number of methods, a threshold request count may alternatively be set for each type of URI (Uniform Resource Identifier such as a URL), which is contained in the HTTP request information, and used as the illegal communication standard rule.

In the abovementioned instance, the requested URI type is determined in a predetermined manner, and then the number of requests is counted for each determined type to compare the number against the associated threshold value and check for an illegal communication. Here, the URI type can be determined, for instance, by checking the extension added to the URI. The URI can be recognized as a mere document if, for instance, the URI-extension combination is "abcd.html" or "abcd.txt", or recognized as an executable if the employed threshold value is "exe" or "cgi" as in "abcd.exe" or "abcd.cgi".

If, for instance, an executable type URI is requested more than three times during a 10-minute period in a situation where the threshold executable type value is set to "3" as the illegal communication standard rule, it is concluded that the communication for such a request is illegal because "a certain threshold value is exceeded by the number of program executions".

Further, the predetermined number of URI requests may be used instead of a requested URI type. For example, the storage section 12 stores beforehand the information about at least one URI of interest (this information corresponds to protection information according to the present invention), and the control section 11 counts the number of requests that were issued during the last 10-minute period in relation to the URI of interest. Here, a threshold value for the number of requests related to the URI of interest is predetermined as the illegal communication standard rule. When the count reached exceeds the threshold value, it is concluded that the request-related communication is illegal. When the URI identifying secret information stored in the server 31 is set as the URI of interest, it is concluded that an illegal communication is encountered when "a certain threshold value is exceeded by the number of accesses to a secret file".

Further, the count weight information such as the degree-of-secrecy information about each URI of interest may be defined. An illegal communication can be checked for by determining whether a predetermined threshold value is exceeded by the sum of the weight information.

In the above instance, a list of URIs of interest may be acquired from the server 31 and stored in the storage section 12. More specifically, when a document management system is operated by the server 31, the server 31 may supply a URI list of files that are defined as secret information by the document management system, and the control section 11 may store the supplied list in the storage section 12. As described above, the control section 11 may generate an illegal communication standard rule in accordance with the information derived from a protection-targeted device.

Alternatively, the amount of information (the number of bytes or URIs) transmitted to the user during a predetermined period of time may be calculated to check whether a predetermined threshold value is exceeded by the calculated amount of information. If the predetermined threshold value is exceeded, it can be concluded that an illegal communication is encountered. This ensures that an illegal communication is detected when "a certain threshold value is exceeded by the amount of information transferred to the external network".

The illegal communication standard rule for use in the control section 11 may be formulated using the conditions for communications from an external device (external user terminal 21 in the presently used example). The conditions may be stipulated, for instance, by an IP address that may be assigned to the external user terminal 21, a time slot defined for communications from the external user terminal, or the time spent for communications.

If, for instance, the employed illegal communication standard rule is formulated using conditions concerning an IP address, IP addresses that may be used are enumerated and stored in the storage section 12 beforehand. A check is conducted to determine whether the source IP address information about a request received from the external network 2 (the IP address of a terminal that has generated the request) is contained in a group of IP addresses registered in association with the information set in the associated Authorization field. If such information is not contained, it is concluded that the request is an illegal communication. A user authorized to access the server 31 within a corporation via the external network 2 stores beforehand in the storage section 12 a range of IP addresses that the Internet service provider (ISP) with which the user has a contract may assign to the external user terminal 21 for use by the user. This ensures that the user connects the external user terminal 21 to the network. Therefore, when the ISP with which the user has a contract is requested to supply a global IP address, an IP address within the stored range is assigned (by, for instance, the DHCP). The received request is then recognized as the one from the assigned IP address, accepted by the control section 11, and handled as a legal communication.

If, on the other hand, a malicious user attempts to establish communication by, for instance, using someone else's ISP, the control section 11 finds that the employed IP address is not registered. Therefore, an illegal communication is detected even if the malicious user is successfully authenticated by the server 31.

When a communication time slot is used, HTTP request recordings are sorted into various request reception time slots and calculated. The results of calculations are then used to check for an illegal communication. A user authorized to access the server 31 within a corporation via the external network 2 stores beforehand in the storage section 12 the information indicating an access time slot. If the time slot used for the user's HTTP request does not agree with the time slot indicated by the stored information, the control section 11 concludes that an illegal communication is encountered.

The time slot information represents the time between 00:00 and 23:59, and the time is divided into 48 blocks, each of which is 30 minutes long. The control section 11 calculates the number of recorded HTTP requests for each of the 48 blocks. If a predetermined threshold value is exceeded by the number of requests in time slots other than a preselected time slot, the control section 11 concludes that an illegal communication is encountered. Further, the access time slot information may be set after being sorted by the day of the week or differentiated between weekdays and holidays.

The above setup need not always be performed explicitly by each user. Instead, the control section 11 may perform the above setup by extracting information from the communication history. For example, the control section 11 extracts a group of IP addresses used by a user and records them in the storage section 12 as history information for each user identification information. As regards a request received from the external network 2, the control section 11 checks whether its source IP address information is contained in the group of IP addresses, which are recorded as history information associated with the information entry in the associated Authorization field. If such information is not contained, the control section 11 concludes that the request is an illegal communication.

As regards the access time slot information, the cumulative information about past access time slots is similarly stored in the storage section 12 for each user identification information. A check is conducted to determine whether the time slot for the reception of a request from the external network 2 agrees with the time slot that is recorded as history information associated with the information entry in the associated Authorization field. If the time slots do not agree with each other, it is concluded that the request is an illegal communication.

The use of the abovementioned IP address is merely an example. An alternative is to use only a part of the IP address (network address portion) or use a MAC address or other device-specific addresses (e.g., Ethernet (registered trademark) address).

Further, communication time may be used as the illegal communication standard rule. In this instance, the control section 11 extracts user identification information upon receipt of an HTTP request. The control section also checks whether the user's HTTP request was received in each of the last N (N is a predetermined number) time slots. If the user's HTTP request was received in each of the last N time slots, such "excessively long access" is recognized as an illegal communication because the access has been continuously gained in excess of N time slots.

A combination of the above illegal communication standard rules according to the present embodiment may be used. For example, the detection of an illegal communication may occur when "a certain threshold value is exceeded by the number of folders accessed during a predetermined period of time" and "excessively long access" is encountered.

When a combination of multiple illegal communication standard rules is used as described above, each illegal communication standard rule may be weighted (assigned a point value) so as to use the resulting total value for illegal communication detection purposes. Specific point values are predefined for various illegal communication standard rules. For example, 3 points are assigned to "a certain threshold value is exceeded by the number of folders accessed during a predetermined period of time"; 2 points, "a certain threshold value is exceeded by the amount of information transferred to the external network"; and 4 points, "excessively long access". If, for instance, "a certain threshold value is exceeded by the number of folders accessed during a predetermined period of time" and "excessively long access" is encountered, the associated point values are added together (the resulting point value is 7 points). If a predetermined threshold value is exceeded by the resulting point value, it is concluded that an illegal communication is encountered.

It is also possible to recognize only a specific combination as an illegal communication. For example, when "access is gained in a time slot that is not found in the past record" and "a predetermined threshold value is exceeded by the number of DELETE methods", it is concluded that an illegal communication is encountered; however, no illegal communication is detected when "access is gained in a time slot that is not found in the past record" and "a predetermined threshold value is exceeded by the number of GET methods".

When started in compliance with instructions issued by the illegal communication detection process section 43, the responsive process section 44 of the program executed by the control section 11 causes the control section 11 to perform a predetermined responsive process. The control section 11 performs a process for transmitting report information to a preselected contact to be reached or terminating an intermediary process as a process of the responsive process section 44.

The control section 11 associates predefined contact information with the information (user identification information) contained in the Authorization field of an HTTP request, stores such information in the storage section 12, extracts the information contained in the Authorization field related to a group of HTTP requests detected as illegal communications, obtains contact information stored in association with the extracted information, and notifies the contact to be reached that an illegal communication is encountered.

In one aspect of the present invention, any illegal communication may be reported with e-mail while using an e-mail address as the contact to be reached. In such an instance, the control section 11 operates as an e-mail client and causes an e-mail server (SMTP server), which is connected to the external network 2 or internal network 3, to transmit e-mail to the contact to be reached.

In another aspect of the present invention, a telephone, fax machine, or other similar device may be used. If, for instance, a telephone is used, the control section 11 calls a telephone number, which is specified as the contact to be reached, via a telephone line link, which is not shown. When the telephone call is answered, the control section 11 transmits an audio signal to state that an illegal communication is encountered. If, on the other hand, a fax machine is used, the control section 11 similarly calls a fax number. When the call is answered, the control section 11 transmits a fax signal, which carries image data to state that an illegal communication is encountered.

In still another aspect of the present invention, instant messaging (Internet Relay Chat (IRC) or other forms of communication in which users ready for communication via the Internet instantaneously exchange messages) may be used for reporting purposes. For example, the control section 11 transmits a character string and the like, which states that an illegal communication is encountered, to a predetermined user address or number (which can be expressed by an IP address or a user code registered with an instant messaging server).

The foregoing description assumes that an illegal communication is to be reported to a user related to an HTTP request that is detected as an illegal communication. Alternatively, however, the detection of an illegal communication may be reported to a preselected administrator instead of the user or in addition to the user.

When the control section 11 stops an intermediary process as a process of the responsive process section 44, the control section 11 extracts the information (user identification information) contained in the Authorization field for a group of HTTP requests detected as illegal communications, and records the user identified by the extracted information in the storage section 12 as a user targeted for disconnection. In this instance, when the control section 11 receives HTTP request information addressed to the server 31 in the internal network 3 from the external network 2 as a process of the intermediary process section 41, the control section 11 references user identification information contained in the HTTP request information. If the referenced information relates to a user that is recorded in the storage section 12 and targeted for disconnection, the control section 11 transmits an HTTP response to indicate, for instance, an authentication failure (error 401) or connection prohibition (error 403), and discards the HTTP request without transmitting it to the server 31. In this instance, the source IP address of a group of HTTP requests detected as illegal communications may be extracted so that when the information addressed to the extracted IP address is received from the server 31, it may be discarded without transmitting it to the external network 2.

After informing the user, administrator or other preselected notification destination of an illegal communication, the responsive process section 44 may determine whether or not to stop the intermediary process depending on whether information is received from such a notification destination or in accordance with the contents of the received information. The control section 11 operates as a Web server, issues a unique file name upon detection of an illegal communication, and generates and retains a Web page, under the issued file name, for inquiring whether the communication is to be continued. Further, the control section 11 inserts the URL of the generated Web page into a notification for indicating the existence of an illegal communication and sends the notification to the preselected notification destination.

The control section 11 uses a timer (not shown) to monitor the elapsed time from the notification. If the notification destination does not access the above URL within a predetermined period of time (the Web server log indicates whether the URL is accessed), the control section 11 performs a process for stopping the intermediary process in order to cut off (part of) the communication from the external network 2 to the server 31, which is a protection-targeted device.

The response from the notification destination need not always be a feedback described above. For example, the user may call the telephone number of a telephone line link (not shown) that is provided for the illegal communication detector 1 so as to stop the intermediary process if the telephone number is not called within a preselected period of time.

In addition to the feedback for inquiring whether the communication is to be continued, the URL and telephone number for receiving the instructions for resuming communication after it is interrupted may also be included in the notification. If, in this instance, any user accesses the URL for receiving the instructions for resuming communication or calls the phone number, the control section 11 deletes the user (the caller identification service is available from a telephone line network when the telephone is used) from a list of users that are targeted for disconnection and stored in the storage section 12.

The illegal communication detector 1 according to the present embodiment is configured as described above to perform the operations described below. The illegal communication detector 1 does nothing about HTTP requests that are transmitted from a terminal (not shown) in the internal network 3 to the server 31.

As regards request or other information that is transmitted from the external user terminal 21 or other similar terminal in the external network 2 to the internal network 3, user authentication is conducted in a manner similar to HTTP basic authentication. The resulting user authentication information is then associated with various request information (the user identification information, which is generally contained in an HTTP request after basic authentication in compliance with the client software specifications, should be used for HTTP), and the received request information is recorded for each user identified by the user authentication information.

Further, the illegal communication detector 1 transmits the request information to the internal network 3, receives the information about a response to the request information from the request information recipient (e.g., server 31) of the internal network 3, records the response information as well as the request information for each user identified by the user authentication information, and transmits the response information to the external user terminal 21 in the external network 2.

At a predetermined time (e.g., at periodic intervals), the illegal communication detector 1 references request information and response information that were recorded during a past predetermined period of time. If any excessive access is found, the illegal communication detector 1 concludes that an illegal communication is encountered. The illegal communication detector 1 detects an illegal communication if the amount of file transfer to the external network 2 during a predetermined period of time exceeds the associated threshold value (e.g., the cumulative value of Content-Length field information contained in the response information can be used in the case of HTTP), if the number of accessed folder exceeds the associated threshold value, if the number of accesses to a file targeted for protection exceeds the associated threshold value, if the number of file deletion requests exceeds the associated threshold value, or if the number of program execution requests exceeds the associated threshold value.

The above is based on the fact that it is empirically conceivable that when an authorized user belonging to an organization accesses a network within the organization as in accessing the internal network 3 from the external network 2, such an access is for temporary network use only. Further, such an authorized user is quite familiar with the network configuration and able to quickly access the target information. It means that the access of such an authorized user is more or less limited.

In a situation where the IP address to be assigned to the external user terminal 21 for an authorized user is known or the user's access time slot is known, an illegal communication is detected if a preselected setting, a network address (IP address, etc.) preregistered for the external user terminal 21 in accordance with history information, or an address recorded as history information is not complied with. Further, an illegal communication may be detected if the access time slot does not agree with a preregistered time slot or previously recorded time slot for past access. In addition, an illegal communication may be detected if access is excessively long. Furthermore, the above conditions may be combined to determine whether an illegal communication is encountered.

When it is concluded that an illegal communication is encountered, the illegal communication detector 1 extracts user authentication information from multiple sets of request information recognized as illegal communications, and notifies the contact to be reached, which is predefined in association with the user authentication information, that an illegal communication is detected. The illegal communication detector 1 then monitors, for a predetermined period of time, whether the information about communication continuation can be accepted from the contact to be reached. If such information is not acceptable, the illegal communication detector 1 stops accepting the request information including the user authentication information.

An illegal communication from a malicious user (spoofing user) who is successfully authenticated in a basic authentication or a similar process can be effectively detected and blocked.

The configuration and operation of the illegal communication detector 1 have been described. However, such a description is to be considered in all respects only as illustrative and not restrictive. For example, the control section 11 of the illegal communication detector 1 may acquire a record of request information (e.g., Web server log) accepted by the server 31 from the server 31, which is a protection-targeted device, without performing an information recording process 42, extract only the information related to the communications from the external network 2, and examine the extracted information to check for an illegal communication.

The foregoing description assumes that an external network accesses a server within a corporation. However, the present invention can also be applied to a situation where, even within the same corporation or organization, a network for use by ordinary members is separated from a network to which a server for supplying the information to be protected is connected and these networks are interconnected via the illegal communication detector 1.

The illegal communication detector 1 may control a relay process of an external proxy server and the like without performing a relay process itself.

The illegal communication detection process section 43 may perform an illegal communication detection process only on the information prevailing after user authentication, which is contained in the information recorded by the information recording section 42. When the information recording section 42 records only the information prevailing after user authentication or the illegal communication detection process section 43 performs an illegal communication detection process only on the information prevailing after user authentication, the information prevailing after user authentication is used to determine whether a predetermined illegal communication standard rule is complied with.

The illegal communication detector 1 may be integral with a server (server 31 in the above example) that performs a process in accordance with the user authentication result. If, for instance, NAT (Network Address Translation) or application-type firewall (which is implemented as the program to be executed by the server 31) is used in this situation, access accepted via NAT or firewall can be recognized as access from an external network while recognizing the other types of access as access from an internal network.

The entire disclosure of Japanese Patent Application No. 2003-279958 filed on Jul. 25, 2003 including specification, claims, drawings and abstract is incorporated herein by reference in its entirety.

What is claimed is:

1. An illegal communication detector that is mounted in a communication path between specific devices and a protection-targeted device to monitor contents of communications delivered to the protection-targeted device, the illegal communication detector comprising:
    a recorder that records at least part of information transmitted from the specific devices to the protection-targeted device; and
    a detector that regards one of the specific devices as a device of interest and detects, when at least part of the recorded information transmitted from the device of interest complies with a predetermined illegal communication standard rule, that the contents of communication are derived from an illegal communication,
    wherein the illegal communication standard rule is formulated according to a number of an item of method information included in the recorded information.

2. An illegal communication detector that is mounted in a communication path between specific devices and a protection-targeted device to monitor contents of communications delivered to the protection-targeted device, the illegal communication detector comprising:
    a recorder that records at least part of information transmitted from the specific devices to the protection-targeted device; and
    a detector that regards one of the specific devices as a device of interest and detects, when at least part of the recorded information transmitted from the device of interest complies with a predetermined illegal communication standard rule, that the contents of communication are derived from an illegal communication,
    wherein the illegal communication standard rule is formulated according to a number of request count for each type of URI included in the recorded information.

3. An illegal communication detector that is mounted in a communication path between specific devices and a protection-targeted device to monitor contents of communications delivered to the protection-targeted device, the illegal communication detector comprising:
    a recorder that records at least part of information transmitted from the specific devices to the protection-targeted device; and
    a detector that regards one of the specific devices as a device of interest and detects, when at least part of the recorded information transmitted from the device of interest complies with a predetermined illegal communication standard rule, that the contents of communication are derived from an illegal communication,
    wherein the illegal communication detector further comprises a memory that stores information identifying protection information that is at least part of information transmittable by the protection-targeted device, wherein the illegal communication standard rule is formulated according to a number of accesses to the protection information identified by the stored information.

4. An illegal communication detector that is mounted in a communication path between specific devices and a protection-targeted device to monitor contents of communications delivered to the protection-targeted device, the illegal communication detector comprising:
    a recorder that records at least part of information transmitted from the specific devices to the protection-targeted device;
    a memory that stores information about conditions for the communication from each of the specific devices; and
    a detector that regards one of the specific devices as a device of interest and detects, when at least part of the recorded information transmitted from the device of interest complies with the information about the conditions for the communication, that the contents of communication are derived from an illegal communication,
    wherein the information about the conditions for the communication includes a group information of IP addresses.

5. An illegal communication detector that is mounted in a communication path between specific devices and a protection-targeted device to monitor contents of communications delivered to the protection-targeted device, the illegal communication detector comprising:
    a recorder that records at least part of information transmitted from the specific devices to the protection-targeted device;
    a memory that stores information about conditions for the communication from each of the specific devices; and
    a detector that regards one of the specific devices as a device of interest and detects, when at least part of the recorded information transmitted from the device of interest complies with the information about the conditions for the communication, that the contents of communication are derived from an illegal communication,
    wherein the information about the conditions for the communication includes information indicating an access time.

6. An illegal communication detector that is mounted in a communication path between specific devices and a protection-targeted device to monitor contents of communications delivered to the protection-targeted device, the illegal communication detector comprising:
    a recorder that records at least part of information transmitted from the specific devices to the protection-targeted device;
    a memory that stores information about conditions for the communication from each of the specific devices; and
    a detector that regards one of the specific devices as a device of interest and detects, when at least part of the recorded information transmitted from the device of interest complies with the information about the conditions for the communication, that the contents of communication are derived from an illegal communication,
    wherein the information about the conditions for the communication is set by extracting information from the communication history.

7. An illegal communication detector that is mounted in a communication path between specific devices and a protection-targeted device to monitor contents of communications delivered to the protection-targeted device, the illegal communication detector comprising:
    a recorder that records at least part of information transmitted from the specific devices to the protection-targeted device;
    a detector that regards one of the specific devices as a device of interest and detects, when at least part of the recorded information transmitted from the device of interest complies with a predetermined illegal communication standard rule, that the contents of communication are derived from an illegal communication; and a communication controller that performs a predetermined process concerning the communication with the device of interest.

8. The illegal communication detector according to claim 7, further comprising an acquiring part that acquires information about a contact to be reached upon detection of an illegal communication, wherein, upon detection of an illegal communication, the communication controller conveys specified information to the contact to be reached.

9. The illegal communication detector according to claim 8, wherein the acquiring unit acquires authentication information about a user transmitting information from the device of interest and obtains contact information about the authenticated user as the contact information for use when an illegal communication is detected.

10. The illegal communication detector according to claim 8, wherein, if predetermined information is not received from the contact to which the specified information is conveyed, the communication controller stores the information for identifying a device of interest involved in the illegal communication and performs a process for stopping the information transmission from the device of interest, which is identified by the stored information, to the protection-targeted device.

11. The illegal communication detector according to claim 7, wherein, upon detection of an illegal communication, the communication controller stores information for identifying a device of interest involved in the illegal communication and performs a process for stopping information transmission from the device of interest, which is identified by the stored information, to the protection-targeted device.

12. An illegal communication detector that is mounted in a communication path between specific devices and a protection-targeted device to monitor contents of communications delivered to the protection-targeted device, the illegal communication detector comprising:

a recorder that records at least part of information transmitted from the specific devices to the protection-targeted device; and a detector that regards one of the specific devices as a device of interest and detects, when at least part of the recorded information transmitted from the device of interest complies with a predetermined illegal communication standard rule, that the contents of communication are derived from an illegal communication, wherein the detector determines, in accordance with the information transmitted from the device of interest and recorded that prevails after authenticating a user transmitting information from the device of interest, whether a predetermined illegal communication standard rule is complied with.

13. An illegal communication detector that is included in a system providing communication between a first network and a second network to monitor contents of communications delivered from a device in the first network to a protection-targeted device that is in the second network, the illegal communication detector comprising:

a recorder that records at least part of information transmitted from the specific devices to the protection-targeted device; and a detector that regards one of the specific devices as a device of interest and detects, when at least part of the recorded information transmitted from the device of interest complies with a predetermined illegal communication standard rule, that the contents of communication are derived from an illegal communication, wherein the illegal communication standard rule is formulated according to a number of an item of method information included in the recorded information.

14. A method for controlling an illegal communication detector that is mounted in a communication path between external devices and a protection-targeted device to monitor contents of communications delivered to the protection-targeted device, the method comprising:

recording at least part of information transmitted from the external devices to the protection-targeted device;

regarding one of the specific devices as a device of interest; and detecting, when at least part of the recorded information transmitted from the device of interest complies with a predetermined illegal communication standard rule, that the contents of communication are derived from an illegal communication, wherein the illegal communication standard rule is formulated according to a number of an item of method information included in the recorded information.

15. A method for controlling an illegal communication detector that is mounted in a communication path between external devices and a protection-targeted device to monitor contents of communications delivered to the protection-targeted device, the method comprising:

recording at least part of information transmitted from the specific devices to the protection-targeted device;

regarding one of the specific devices as a device of interest;

detecting, when at least part of the recorded information transmitted from the device of interest complies with a predetermined illegal communication standard rule, that the contents of communication are derived from an illegal communication; and performing a predetermined process concerning the communication with the device of interest.

16. A storage medium readable by a computer, the storage medium storing a program of instructions executable by the computer, which causes an illegal communication detector mounted in a communication path between external devices and a protection-targeted device for monitoring contents of communications delivered to the protection-targeted device to perform a function, the function comprising:

recording at least part of information transmitted from the external devices to the protection-targeted device;

regarding one of the specific devices as a device of interest; and detecting, when at least part of the recorded information transmitted from the device of interest complies with a predetermined illegal communication standard rule, that the contents of communication are derived from an illegal communication.

* * * * *